US010628635B1

(12) United States Patent
Carpenter, II et al.

(10) Patent No.: US 10,628,635 B1
(45) Date of Patent: Apr. 21, 2020

(54) ARTIFICIALLY INTELLIGENT HOLOGRAM

(71) Applicant: Valyant Al, LLC, Denver, CO (US)

(72) Inventors: Robley Theron Carpenter, II, Denver, CO (US); Benjamin William Thielker, Denver, CO (US)

(73) Assignee: Valyant AI, Inc., Denver, CO (US)

( * ) Notice: Subject to any disclaimer, the term of this patent is extended or adjusted under 35 U.S.C. 154(b) by 71 days.

(21) Appl. No.: 15/723,573

(22) Filed: Oct. 3, 2017

Related U.S. Application Data (60) Provisional application No. 62/478,454, filed on Mar. 29, 2017.

(51) Int. Cl.
| | | |
|---|---|---|
| *G06F 40/279* | (2020.01) | |
| *G10L 15/26* | (2006.01) | |
| *G10L 13/02* | (2013.01) | |
| *G10L 15/18* | (2013.01) | |
| *G06F 16/332* | (2019.01) | |
| *G06F 40/30* | (2020.01) | |

(52) U.S. Cl.
CPC ........ *G06F 40/279* (2020.01); *G06F 16/3329* (2019.01); *G06F 40/30* (2020.01); *G10L 13/02* (2013.01); *G10L 15/1815* (2013.01); *G10L 15/26* (2013.01)

(58) Field of Classification Search
CPC .............................. G06F 3/017; G06F 17/2765
USPC ........................................ 704/270, 260, 235
See application file for complete search history.

(56) References Cited

U.S. PATENT DOCUMENTS

| | | | |
|---|---|---|---|
| 6,584,439 B1 | 6/2003 | Geilhute et al. | |
| 9,548,050 B2 | 1/2017 | Gruber et al. | |
| 10,049,663 B2 * | 8/2018 | Orr | G10L 25/84 |
| 2002/0010584 A1 * | 1/2002 | Schultz | G06F 3/16 |
| | | | 704/270 |
| 2005/0171944 A1 * | 8/2005 | Palmquist | G06F 17/2735 |
| 2007/0208570 A1 * | 9/2007 | Bhardwaj | H04M 3/51 |
| | | | 704/270.1 |
| 2010/0121808 A1 * | 5/2010 | Kuhn | G07F 17/32 |
| | | | 706/50 |
| 2011/0283190 A1 * | 11/2011 | Poltorak | G10L 13/033 |
| | | | 715/716 |

(Continued)

*Primary Examiner* — Jakieda R Jackson
(74) *Attorney, Agent, or Firm* — Rocky Mountain Patent LLC; Tyler J. Mantooth (57) ABSTRACT

A conversational holographic assistant displays a computer-generated human-like hologram capable of carrying on conversations in real-time with a user, remembering things about past interactions with the user to make the conversation realistic and more human-like. The system is intended to be utilized in retail, office, business and personal settings to provide service to users. The holographic person can interact with retail point of sale systems in order to process orders on behalf of a user, provide users with detailed directions, and answer questions about the holographic person's surroundings, among other things. In some settings, the holographic person can integrate with existing internet of things devices. The holographic person is implemented through the use of a user recognition component, a user input component, an interpreter component, a machine-readable text processor component, a text-to-audio generator component and a text-to-visual display generator component, and an output processor component.

20 Claims, 8 Drawing Sheets (56) References Cited

U.S. PATENT DOCUMENTS

| | | | |
|---|---|---|---|
| 2013/0106685 A1* | 5/2013 | Davis | G06F 16/00 |
| | | | 345/156 |
| 2014/0310595 A1* | 10/2014 | Acharya | G06F 9/453 |
| | | | 715/706 |
| 2015/0169336 A1* | 6/2015 | Harper | G10L 15/22 |
| | | | 715/706 |
| 2016/0284157 A1* | 9/2016 | Marrinson | G07F 17/323 |
| 2017/0160813 A1* | 6/2017 | Divakaran | G06F 3/017 |
| 2017/0235404 A1* | 8/2017 | Grivna | G06F 3/0416 |
| | | | 345/174 |

* cited by examiner

ARTIFICIALLY INTELLIGENT HOLOGRAM

RELATED APPLICATIONS

This application hereby claims the benefit of and priority to U.S. Provisional Patent Application 62/478,454, titled "ARTIFICIALLY INTELLIGENT HOLOGRAM", filed Mar. 29, 2017, and which is hereby incorporated by reference in its entirety.

TECHNICAL BACKGROUND

The present disclosure relates generally to digital assistant systems in humanoid form employing facial recognition software, natural language processing, artificial intelligence, text to speech software, real time 3D rendering of computer animations and a holographic image display system.

Currently available digital assistant systems may be in the form of software running on mobile cell phones or browser-based website applications, or, may be in the form of in-home devices that look like speakers, in order to provide users with a way to ask questions and receive information through voice inputs. For example, interested readers may review U.S. Pat. No. 9,548,050, titled "Intelligent Automated Assistant," and U.S. Pat. No. 6,584,439, titled "Method and Apparatus for Controlling Voice Controlled Device." Although these are functional ways for a user to interact with a digital assistant in order to receive information (such as the weather and driving conditions), these interactions do not necessarily provide a satisfying experience, and they lack in providing the user with the experience of interacting with another human being.

Kiosks, vending machines, and automated teller machines are examples of physical consoles that a user can walk up to and receive something back, tangible or non-tangible. With respect to kiosks, the tangible output might be something like a prepaid phone card, or even a device, like headphones. Vending machines obviously provide tangible output in the form of drinks and snacks. Similarly, automated teller machines usually dispense cash after receiving a set of detailed inputs from the user.

Existing digital assistants do not typically use facial recognition software. Facial recognition software is still limited in practical applications, primarily being used for security and threat assessment technologies by the government as well as social media platforms. Existing facial recognition software involves uploading pictures of a specific person to a database and then running them through an advanced algorithm to determine the individual's identity. Commercial applications for facial recognition software are limited to social media and photo sharing applications that utilize the software to differentiate individuals in photos. There are no commercially available digital assistants, kiosks, vending machines, or automated teller machines that utilize facial recognition software to validate and differentiate users who are speaking to the system.

Natural language processing is currently used by several major technology corporations for a variety of reasons. The two primary commercial applications of natural language processing are for asking questions that can be answered through a search engine and for requesting music playback. These common applications are generally accomplished through the use of digital assistant software that is embedded into mobile cell phones and into pieces of hardware that look like speakers. There are currently no commercial applications of natural language processing software utilized for the purposes of carrying on a two-way conversation with a computer or holographic simulation of a person with the intent to conduct business or purchase something from the area or retail location.

Artificial intelligence is an expansive term that comprises the goal of a machine, device, or software program to perceive its environment, take actions, and influence outcomes. A program is deemed to be artificially intelligent when it is capable of mimicking the cognitive functions of a human and creating the illusion that a user is speaking with another person. Early examples of this software include Chatbots, a technology that has been developed over the past two decades. More recently, artificial intelligence technologies have greatly advanced through various devices like IBM's Watson. Watson's server-based software program is now being extended and provided to governments, universities and businesses to find patterns within massive amounts of seemingly disparate data. Although Watson and other devices like Watson have been packaged inside of hardware for interaction in the real world beyond the internet and localized computers, there currently doesn't exist any artificial intelligent systems in the retail and office environments that allow customers and employees to converse in real-time with the artificial intelligence through a holographic representation of a human in order to receive a service or seek some desired outcome.

Some existing systems incorporate a concept called "machine learning", which provides the ability for the software platform to learn without being specifically programmed by a person. Machine learning is a form of advanced pattern recognition that utilizes past experiences to build assumptions about collected data and make informed guesses about optimal solutions based on incomplete information. Machine learning is being utilized by major corporations and governments around the world to analyze massive amounts of data related to populations, citizens, and customers. Existing digital assistant technology utilizes basic machine learning concepts in order to remember things like driving directions, where users live, when they should leave for a meeting, and what type of music and news a specific user enjoys. Additionally, certain smart home devices, like thermostats, can learn user preferences over time and automatically adjust their settings based on user preferences, time, and location for things like temperature or lawn watering schedules.

These forms of basic machine learning or conceptual awareness programs have started to permeate into commercial applications and do make users' lives easier. However, as discussed above, there are currently no commercial or business applications for human-like computer generated imagery that remembers user preferences and tastes and provides a service to the user. This new application incorporates modern machine learning technologies into a completely new and different application in the marketplace.

Text-to-speech software converts text into speech based on a pre-synthesized voice. Currently most individuals interact with computers and software through touch pads, keyboards, computer mice, computer monitors and mobile phone screens. As a result, there is not currently a strong need in these mediums to expand upon the existing infrastructure of predominantly text-based forms of digital communication with auditory ones. One of the more widely used forms of text-to-speech are digital assistant software programs that provide audio responses to a user's questions or requests. Most major global positioning systems that provide turn-by-turn directions utilize text-to-speech communication programs in order to allow the driver to keep their eyes on the road while still receiving directions. Other common applications for commercial and residential text to speech software programs are used by individuals with disabilities—for example, the famed physicist, Stephen Hawking.

Speech-based training algorithms involve the process of using spoken language to provide feedback to an artificially intelligent software application. There are no existing direct comparisons for speech-based training programs to update the programming of a software application.

Computer generated imagery (CGI) is a very well-established industry, with major uses for things like entertainment, making movies, music videos, and video games. CGI is also utilized in commercials to create simulated environments and advertisements. Computer generated imagery is most often pre-rendered or created in advance of a user being able to watch or interact with the CGI. For example, most modern animated movies incorporate some form of pre-rendered CGI. There are very few applications where CGI is rendered or moved from the creation environment to an environment where it can be enjoyed in real-time. The reason for this is that most CGI programs require large amounts of data processing power to produce an image, and most computing systems cannot handle such burdensome requests. Very few real-time systems use CGI technologies, especially within consumer and business settings.

Projection systems exist in many applications across retail, office and personal settings to display images. For example, they are utilized by movie theaters and home users who wish to project movies, television shows, and video games onto large surfaces in order to create massive screens. Projection systems are also used in advertising settings to display products or services onto a wall or window in order to catch the attention of users passing by the projection system. Certain retail environments may use a projection system coupled with a glass or plastic surface in order to present music videos and advertisements to users in the area. There does not currently exist any applications in the consumer or personal market that utilizes projection systems to display a human-like computer generated image for the purpose of carrying on conversations and completing specific business tasks like buying movie tickets or purchasing food.

In summary, no product currently exists that combines facial recognition software, natural language processing, artificial intelligence principles, text-to-speech software, and CGI to produce a conversational holographic assistant for providing services to a user in real-time.

SUMMARY

Disclosed herein is a conversational holographic assistant for providing services to a user in real-time, a method for communicating with a conversational holographic assistant in real-time, and a non-transitory computer-readable medium for implementing a conversational holographic assistant. In one embodiment, a conversational holographic assistant operating on one or more computing devices for providing services to a user in real-time comprises a user recognition component for recognizing users and their input preferences. The conversational holographic assistant further comprises an interpreter component, for interpreting the received user input to derive a first machine-readable text when the received user input is a verbal command, a machine-readable text processor component, for processing the first machine-readable text and the user input preferences to generate a service in the form of a second machine-readable text, a text-to-audio generator component and a text-to-visual display generator component, for generating an audio file and corresponding Computer-Generated Imagery (CGI) from the second machine-readable text, and an output processor component, for causing an audiovisual output to be displayed in the form of a hologram based on data received from the generated audio file and corresponding CGI.

In another embodiment, a method for communicating with a conversational holographic assistant on one or more computing devices having one or more processors and memory in real-time comprises, at the one or more computing devices, recognizing a user and the user's input preferences. The method further comprises receiving an input from the user, interpreting the received user input to derive a first machine-readable text, processing the first machine-readable text and the user input preferences to generate a service in the form of a second machine-readable text, generating an audio file and corresponding Computer-Generated Imagery (CGI) from the second machine-readable text, and causing an audiovisual output to be displayed in the form of a hologram based on data received from the generated audio file and corresponding CGI.

In yet another embodiment, a non-transitory computer-readable medium for implementing a conversational holographic assistant on one or more computing devices, the computer-readable medium having instructions stored thereon, the instructions, when executed by one or more processors, cause the processors to perform operations comprising, first recognizing a user and the user's input preferences, receiving an input from the user, and then interpreting the received user input to derive a first machine-readable text. The operations further comprise processing the first machine-readable text and the user input preferences to generate a service in the form of a second machine-readable text, generating an audio file and corresponding Computer-Generated Imagery (CGI) from the second machine-readable text, and then causing an audiovisual output to be displayed in the form of a hologram based on data received from the generated audio file and corresponding CGI. To enhance the user's experience, the system is enabled to remember information about past interactions with the user to make the conversation realistic and more human-like. The system is intended to be utilized in retail, office, business and personal settings to provide service to users. For example, the holographic person can interact with retail point of sale systems in order to process orders on behalf of a user, provide users with detailed directions, and answer questions about the holographic person's surroundings, among other things. In some settings, the holographic person can integrate with existing internet of things devices.

BRIEF DESCRIPTION OF THE DRAWINGS

The following description and associated figures teach the best mode of the disclosure. For the purpose of teaching inventive principles, some conventional aspects of the best mode can be simplified or omitted. The following claims specify the scope of the disclosure. Note that some aspects of the best mode cannot fall within the scope of the disclosure as specified by the claims. Thus, those skilled in the art will appreciate variations from the best mode that fall within the scope of the disclosure. Those skilled in the art will appreciate that the features described below can be combined in various ways to form multiple variations of the disclosure. As a result, the disclosure is not limited to the specific examples described below, but only by the claims and their equivalents.

DETAILED DESCRIPTION OF THE EXEMPLARY EMBODIMENTS

Embodiments of the present disclosure will now be described in detail with reference to the drawings, which are provided as illustrative examples of the disclosure so as to enable those skilled in the art to practice the disclosure. Notably, the figures and examples below are not meant to limit the scope of the present disclosure to a single embodiment, but other embodiments are possible by way of interchange of some or all of the described or illustrated elements.

Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure. In the present specification, an embodiment showing a singular component should not be considered limiting; rather, the disclosure is intended to encompass other embodiments including a plurality of the same component or nested stages, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

In general, the present application is designed to create the illusion of a person standing and talking with the user. The hardware can be deployed in almost any location, and there is no requirement for additional hardware from the user in order to interact with the holographic person. The user can simply walk up to the device and start talking to the hologram. The hologram is what is created by the CGI program, and presented to the user via a user interface on a rigid panel. The hologram looks, sounds and acts like a person to give the user a realistic experience of human interaction.

To enhance the realistic appeal of the system, the system can use machine learning. For example, the facial recognition component may utilize photos taken of a user by the onboard camera in order to create a visual record for that user. Similarly, a voice record for the user can be used using the on-board microphone. This allows the holographic person to differentiate between users and in future interactions to be able to remember the user and their previous conversations. The ability for the holographic person to build upon past interacts is a very important component in building out the illusion of carrying on a conversation with another sentient person.

The present disclosure is motivated by the need to provide a human-like interactive experience on top of different, pre-existing software and hardware platforms that have never been combined together. The resulting product is a completely new disclosure that does not exist anywhere, or in any form. The key software programs include facial recognition software, natural language processing, artificial intelligence, text-to-speech, speech-based training, computer generated imagery, and a holographic imaging system.

The new proposed system improves upon every one of these existing machines in a variety of different ways. The new system could converse with the user in any language, answer questions about the products, provide reviews, and even utilize sales software, for example, to increase conversion rates and sales of devices, beverages, snacks or banking-related products. As the interaction between the system and the user would occur through natural human language, the user wouldn't have to try and figure out a touch pad, or keypad system, though those options may exist, but instead they could simply talk to the holographic person as if they were speaking directly with a sales person. The owner/administrator of the holographic digital assistant could then track exchanges with the customer interaction in order to update the capabilities of the system, especially in the situation where the system was not able to answer a specific customer question or retrieve statistics on what sales text converted the most sales and generated the most revenue.

There are a number of key components required to successfully create the conversational holographic assistant. They include, but are not limited to, a user recognition component, an input device component, an interpreter component, a machine-readable text component, a text-to-audio component, a text-to-visual display generator component, and an output processor component. It should be understood that the interpreter component may comprise a natural language interpreter component. It should also be further understood that the user recognition component may comprise a facial recognition component. Each of the aforementioned components will discussed in turn.

The conversational holographic assistant comprises a user recognition component that recognizes a physical feature of a user in order to provide customized service to the user. In particular, the conversational holographic assistant may use a camera and computing devices with facial recognition software stored thereon to recognize a user's face. Facial recognition software is an existing technology that is utilized in a new way in combination with other components of the system described in this new disclosure. The system uses hardware for tracking faces in order to assign a name, and create a record for the user that is interacting with the system. This provides numerous advantages to the software, including the ability to tell the difference between multiple speakers in a group, remember previous users in order to recall preferences, expand upon the current knowledge of a user, and for security purposes in order to determine if someone is a potential threat, or if that person is exhibiting any worrying characteristics. Also, optionally, a facial recognition software may have an eye-tracking software component which is able to track a user's gaze to provide feedback to the CGI software that renders the holographic person to make "eye contact" with the user while conversing.

The conversational holographic assistant comprises an input device component whereby a user can provide a variety of inputs to receive personalized service from the conversational holographic assistant. In one embodiment, an input device may comprise a microphone so that a user may deliver a verbal command to the conversational holographic assistant as if the user was conversing with another human being. In another embodiment, an input device may be in the form of a touchscreen where a user can manually input a selection. In further embodiments, an input device may be a keyboard, a computer mouse, a webcam, a pointing device, among other conventional user input devices for interacting with virtual technologies.

The conversational holographic assistant further comprises an interpreter component for interpreting a received user input to derive a first machine-readable text. In one embodiment, the interpreter component comprises a natural language interpreter implemented through computing devices with natural language processing software stored thereon. Natural language processing is utilized to record incoming speech from users, tagged to a specific user in the case of a group based on the facial recognition, and then convert the incoming speech into text. The natural language processing system, in conjunction with the facial recognition software, also enables the system to determine who is currently speaking. Once the user's speech has been converted to text, it passes through an application programming interface and into the onboard or cloud based artificial intelligence software.

The conversational holographic assistant further comprises a machine-readable text processor component for processing the first machine-readable text and the user input preferences to generate a service in the form of a second machine-readable text. Artificial intelligence, machine learning, and speech-based training algorithms are preferably executed as software stored on nonvolatile memory on one or more computing devices so that a service in the form of a second machine-readable text can be generated from the first machine-readable text received from the interpreter component. In other words, one or more artificially intelligent computing devices receives a user's request in the form of a first machine-readable text to produce a second machine-readable text responsive to the request.

Artificial intelligence is the key cornerstone of the conversational holographic assistant's entire software platform. This is where the new system breaks down the meaning of the text that was received from the natural language processing software and determines the correct response to deliver back to the user. As the system is designed to be used in very specific settings, for example restaurants, hotels, and office buildings, the amount of content and answers that are required can be greatly reduced from a general purpose artificial intelligence software system. This helps to enhance user experience by creating a feeling that there is an actual person behind the software. In any situation where the user asks a question outside of the scope of the specific use of the software, the system is capable of returning a generic response about limiting the scope of the questions to the core functions of the holographic person's capabilities and uses. For example, if the holographic person is being used to check in guests at a hotel, and a user asks the holographic person how to build a spaceship, the holographic person can simply thank the user for asking, but reiterate that their purpose is to check them into their hotel room as fast as possible and with as pleasant of an experience as possible.

Another example would be the use of this disclosure outside movie theater box office ticket locations, to carry on conversations with potential customers who are not sure what movie they would like to see. The holographic person is capable of asking the user questions, gaining insight into the user's tastes, likes and dislikes; and then providing that user with a recommended movie that is currently showing and the show time. Furthermore, once the user determines what movie they would like to see, in this example, they are then able to pay the holographic person by swiping their credit card through the onboard credit card processing system that can be attached as an add-on or via a customer account that is already linked with a credit card and validated though the facial recognition software. The holographic person is then able to print out a ticket for that user, with an add-on printer or by sending a digital ticket to the user's smartphone and the movie theater's customer mobile application. The overarching goal is to provide the user with the sense, or feeling that they were communicating with an intelligent entity, just like a natural person.

Machine learning is intimately connected into the artificial intelligence. As the artificial intelligence begins to build a database of information about customers, their preferences, common questions, and requests, the system builds upon its existing knowledge base in order to provide new and unique ways of responding to future users who have similar requests and needs. Users are also able to enhance the internal machine learning capabilities of the system through voice and text inputs to expand the systems knowledge base.

Given the correct security code entered by an administrator of the system, users are able to talk to the holographic person and teach it new responses, and new ways of handling customer responses and questions. The system can track all of these new capabilities, and utilize them in future customer interactions. A sophisticated web application is utilized in order to track all customer requests, and provide the administrator for the holographic person to manually enter new responses, and update the software via text inputs.

Speech-based training algorithms involve the process of using spoken language to provide feedback to an artificially intelligent software application. This feedback can be used to modify the responses the artificial intelligence program would give to a user. For example, if new information were to become available, or a better answer was discovered for helping a user with their request, the artificial intelligence could be updated through verbal instructions, as opposed to computer programming. An administrator with access credentials would receive authorization from the holographic person to modify existing input responses, and then use a special set of commands in order to provide those modified instructions to the software program. As an example, if a movie theater were to use the application to promote a new movie, the theater manager could enter the administrator credentials, and then provide the holographic person with information about a new movie, using natural language to convey the information.

The machine-readable text processor component may be further communicatively coupled to a management system comprising an administrator and a web application to implement administrator rules and changes to the text processor.

In one embodiment, administrators may have duplicates of the same holographic person at multiple retail locations, like a restaurant or movie theater, and they are able to see the assistant's generated responses from all locations and the training each individual holographic person has received. The administrator may duplicate those new learned capabilities in order to expand them to all holographic systems currently in use by that administrator. Every holographic person may be connected to the internet and may have the ability to be remotely updated by its system administrator.

The administrator may also be able to create tests in order to see how customers respond to multiple numbers of different responses from the holographic person, based on similar requests from customers. If the administrator determines that one form of response from the holographic person is more ideal than others, for example the disclosure encourages customers to make additional or larger purchases; the selected response can be moved from the test environment and pushed to all holographic units currently in use by that administrator.

The conversational holographic assistant further comprises a text-to-audio generator component and a text-to-visual display generator component for generating an audio file and corresponding Computer-Generated Imagery (CGI) from the second machine-readable text. 3D computer generated imagery is one of the most critical elements of the entire platform. This new disclosure renders human-looking CGI to provide users responses in real time, meaning they are generated at the same time they are requested. This is something that is very unique, and doesn't currently exist, especially within consumer and business settings. Once the artificial intelligence and machine learning algorithms have determined the correct response to provide to a user based on their requests, then the computer graphics program converts that text speech back to speech audio, and then animate the computer-generated persons mouth, in order to give the impression that the computer —generated person, or holographic person, is speaking back to the user. For example, if the user were to say hello, and the artificial intelligence system decided to also respond with hello, the text 'hello' would pass from the artificial intelligence software to the computer graphics program, and then the holographic persons mouth would be animated to mimic the look of saying the word hello, while the speaker embedded in the hardware played the audio clip 'hello' via text to speech software.

The conversational holographic assistant also comprises an output processor component for causing an audiovisual output to be displayed in the form of a hologram based on data received from the generated audio file and corresponding CGI. In one embodiment, the output processor component comprises a holographic projection system, a key hardware component to provide the complete experience. Once the computer graphics program has rendered the desired result for the response, including moving the lips and generating the sound, the image of the holographic person is projected on to piece of hard plastic or glass panel. The piece of plastic or glass panel may have an arbitrary dimension, for example, five foot, by three foot, as long as it is large enough to provide the user the experience of taking to a real human being. The transparent nature of the plastic or glass helps to continue the illusion that the hologram is actually standing in front of the user and conversing with them in real time. At the base of the projection system there is a box that contains the high-performance computer which is required to host all of the previously mentioned software, and render the computer graphics image. A rear mounted projector may take the feed of the computer graphics from the computer, and then project the image on to the piece of plastic or glass panel.

Figure 1:
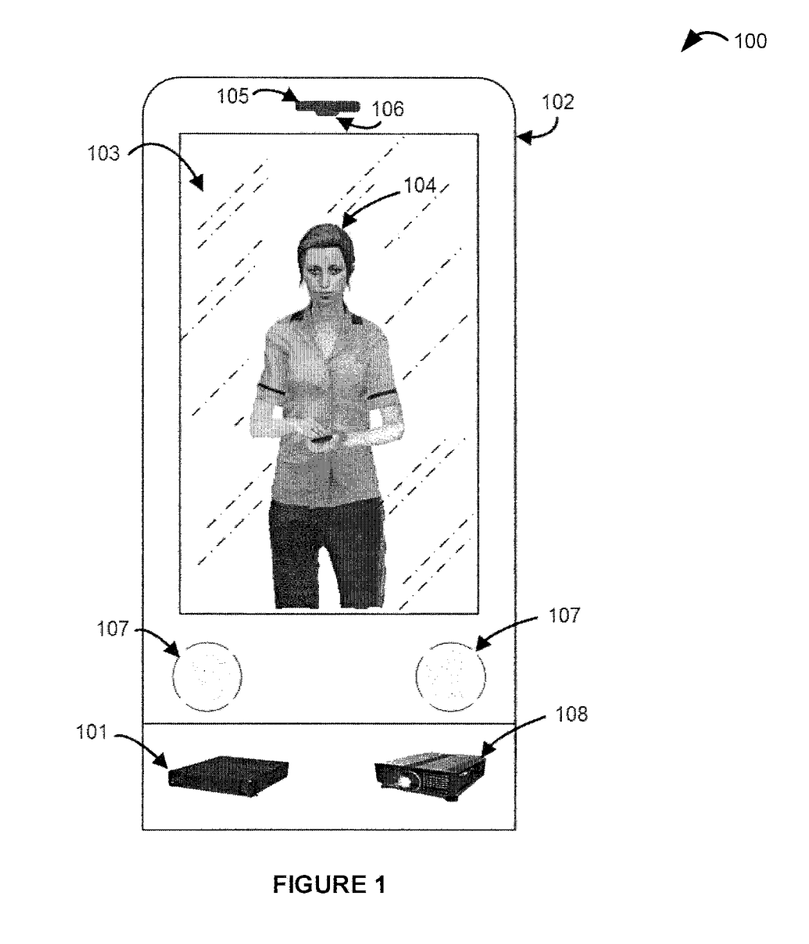
FIG. 1 is a diagram illustrating the front-view of a conversational holographic assistant.

As a first example employing a conversational holographic assistant, FIG. 1 is presented. FIG. 1 is a diagram illustrating the front-view of a conversational holographic assistant. In this non-limiting illustrative embodiment, the conversational holographic assistant system 100 includes one or more computing devices 101, a rigid housing structure 102 to contain various components of the conversational holographic assistant system 100, a transparent rigid panel 103, a virtual representation of a human in the form of a hologram 104, a camera 105 mounted to the top portion (or other suitable location) of the transparent rigid panel 103, a microphone 106, speakers 107, and an optical projection system 108 for displaying the hologram 104. The transparent rigid panel 103 may also have at least a portion with touchscreen capability that is capable of receiving user input. Although not shown for clarity, the transparent rigid panel 103, camera 105, microphone 106, speakers 107, and optical projection system 108 all communicate with the one or more computing devices 101 through a variety of communication links such as wireless signals, HDMI cables, device-specific USB cables, and the like. The transparent rigid panel may have a dimension big enough to display the full body size (or a significant portion thereof) of a typical human being, so that the user gets the sense of actually talking to another human being. For example, the transparent rigid panel may have a rectangular dimension of 5 feet by 3 feet. Also, a variety of display technologies can be used to display the hologram. Though in this example an optical projection system is mentioned, persons skilled in the art would also appreciate that instead of an optical projection system, other type of display technologies can be used in certain embodiments.

To further illustrate FIG. 1, a brief description of the operation of the conversational holographic assistant system 100 is included. Before a user is detected, the optical projection system 108 displays the human-like hologram 104 on the transparent rigid panel 103 in an idle mode. For example, the hologram 104 may appear to be looking away from a forward direction as would a human retail associate when they are not actively servicing a client.

When a user is detected, the camera 105 first detects movement within a predefined distance from the camera 105. The predefined distance preferably is within one meter of the camera 105, but it should be understood that the camera 105 could detect a user at much longer or shorter distances. The camera 105 then takes at least one, but preferably multiple pictures of the detected user. The one or more pictures are then sent over a communication link to the one or more computing devices 101 to determine if the detected user is a previous user. If the detected user is a repeat user, the one or more computing devices 101 causes the hologram to speak to the detected user to see if they would like a service that has been previously performed for the user. If the one or more computing devices 101 determines that the detected user is not a previous user, the conversational holographic assistant performs as follows.

Upon detecting a first-time user, the hologram 104 transitions into an active mode where the hologram 104 speaks to the user through the speakers 107 in a human-like, animated fashion, asking what the user desires in the user's native language. The transparent rigid panel 103 then displays a list of options for the user to choose from. The user then makes an input selection by either verbally communicating a request to the conversational holographic assistant system 100 through the microphone 106, or by touching a selection on the transparent rigid panel 103. Responsive to the input received from the user, the conversational holographic assistant system 100 processes the request and outputs a service in the form of either a visual display on the transparent rigid panel 103 or by verbally communicating an answer to the request through speakers 107, or by both. When the conversational holographic assistant system 100 verbally communicates something to the user, Computer-Generated Imagery (CGI) will reflect the hologram's simulated speech in real-time.

Figure 2:
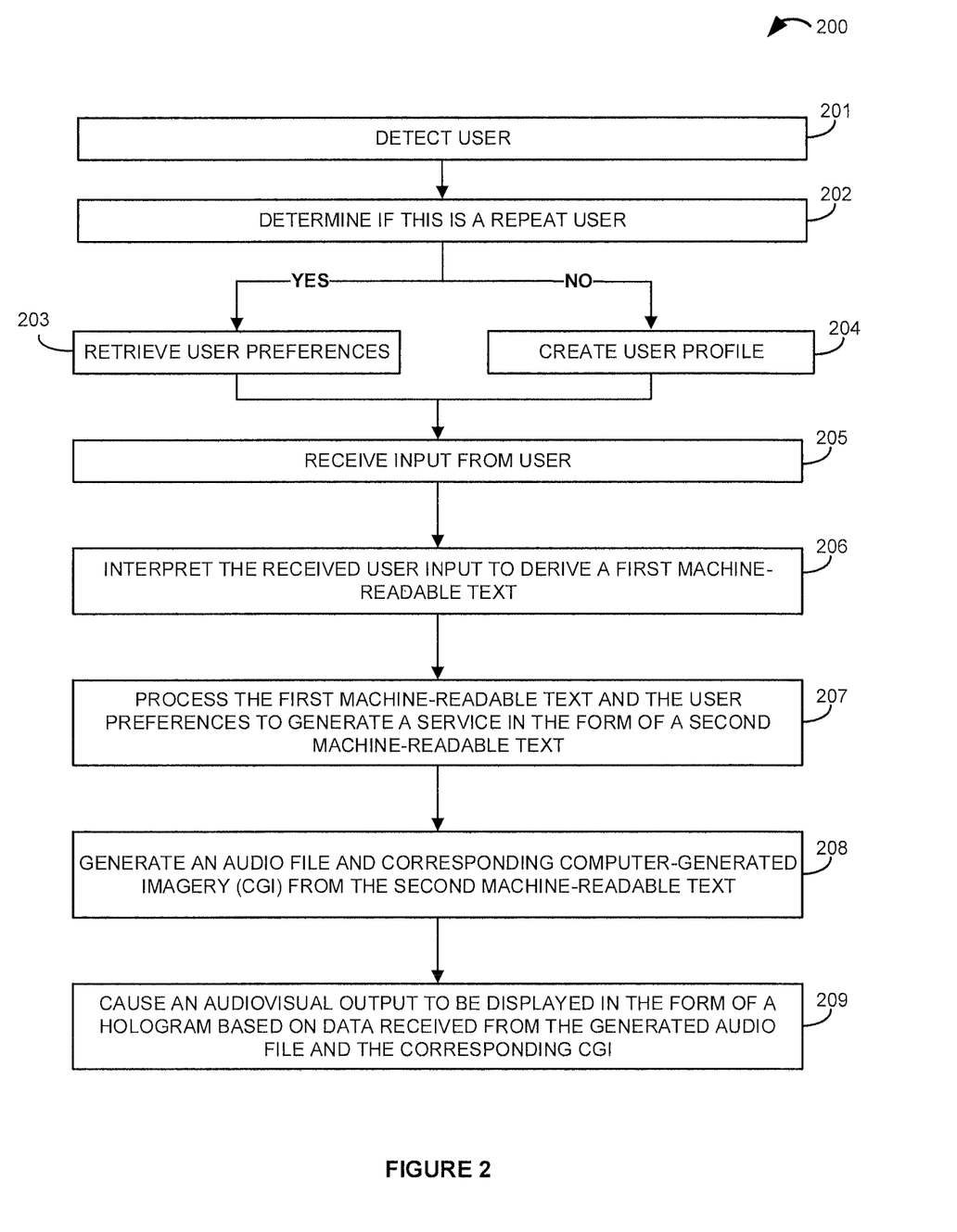
FIG. 2 is a flow diagram illustrating a method of operating a conversational holographic assistant.

FIG. 2 is a flow diagram 200 illustrating a method of operating a conversational holographic assistant. The method provides first detecting a user (201). This step is preferably accomplished through the use of a camera, which may be equipped with an infrared or other types of proximity sensor, configured to take one or more pictures of a user's face when a user is detected within a predefined distance from the camera. The predefined distance is preferably within one meter of the camera, but it should be understood that this distance could be much less or more depending on the operational requirement of the operator of the conversational holographic assistant. Additionally, other techniques for user detection within a predefined distance may be employed, such as using LIDAR or SONAR technology to detect a user. The method further provides, upon detecting a user, determining if the user is a repeat user (202). To accomplish this step, the conversational holographic assistant uses the pictures taken during the detection step (201) and applies facial recognition software to determine if the detected user is a repeat user. If the conversational holographic assistant determines that the detected user is a repeat user, the method then provides that the repeat user's preferences are retrieved (203) from a database. If the conversational holographic assistant determines that the detected user is a first-time user, the method provides that a user profile is created (204). A user profile can include information such as the user's allergy information, the user's previous requests and orders, or the user's preferred language, among other things. The user profile is preferably stored as data on nonvolatile memory on the one or more computing devices 101.

The method further provides receiving input from the detected user (205). The input could be received from the user's verbal command through a microphone 106 or through a user's tactile input on transparent rigid panel 103 with touchscreen capabilities. Upon receiving the user input, the method further provides interpreting the received user input to derive a first machine-readable text (206). The signal received from the microphone 106 can be sent over a communication link to the one or more computing devices 101 where a natural language processor is contained therein. The natural language processor has the ability to process the verbal input and translate it into machine-readable text. The signal received from the panel 103 can also be sent to the one or more computing devices 101 to translate the tactile input into machine-readable text. It should be understood that the interpreting mechanism of step 206 is configured to interpret a variety of inputs and their associated signals, not just an input received form a microphone or touchscreen. The method then provides processing the first machine-readable text and the user preferences to generate a service in the form of a second-machine readable text (207). This step is accomplished through software contained on the one or more computing devices 101 that is capable of taking input text and applying artificial intelligence, machine-learning, and speech-based training algorithms to output a second text responsive to a user's request.

The method further provides generating an audio file and corresponding computer-generated imagery (CGI) from the second machine-readable text (208). The audio file may be a computer-simulated spoken version of the second machine-readable text in the user's language. The audio file may be in a computer-recognizable format, such as an mp3, mp4, way, or some other audio file format. The CGI preferably is a human-like hologram that move its lips in accordance with the speech contained in the generated audio file. The audio file and CGI are also preferably configured to operate in real-time. The method concludes with causing an audiovisual output to be displayed in the form of a hologram based on data received from the generated audio file and the corresponding CGI (209). The hologram 104 at this step will be displayed on the transparent rigid panel 103 with real-time CGI animation that corresponds to a computer-simulated audio output delivered through the speakers 107. The CGI is projected onto the transparent rigid panel 103 through the optical projection system 108 (or other type of display system, depending on the embodiment).

Persons skilled in the art would understand that the steps of flowchart 200 are exemplary. Additional steps may be added, sequence of some of the steps may be altered, and/or some steps may be omitted based on particular embodiments.

Figure 3:
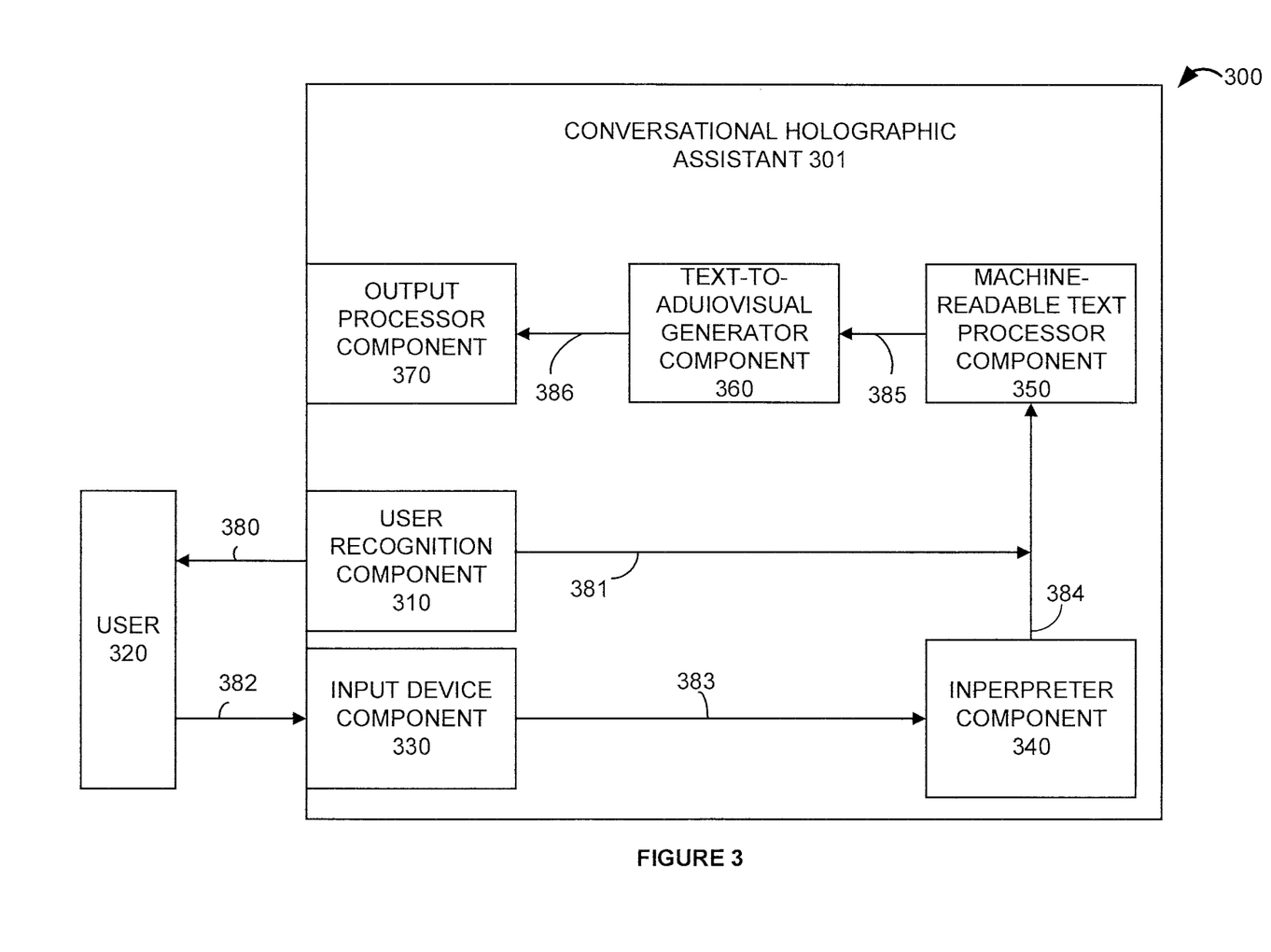
FIG. 3 is a block diagram illustrating the general functional components of a conversational holographic assistant.

FIG. 3 is a block diagram 300 illustrating the general functional components of a conversational holographic assistant 301. The block diagram includes a user 320 and the conversational holographic assistant 301 containing the following components: a user-recognition component 310, an input device component 330, an interpreter component 340, a machine-readable text processor component 350, a text-to-audiovisual generator component 360, and an output processor component 370. The block diagram further includes communication links 380-386 between various components.

In operation, user recognition component 310 first detects user 320 through communication link 380. If the user recognition component 310 determines that user 320 is a repeat user, the user recognition component 310 then retrieves user 320's preferences. Optionally, the user recognition component may greet the repeat user and ask for the repeat user's confirmation of the retrieved preferences, or give the repeat user the option to indicate new preferences. The user recognition component then sends user preference information to machine-readable text processor component 350 over communication link 381. If the user recognition component 310 does not recognize user 320, then the user recognition component 310 creates a user profile of the user 320's preferences. The input device component 330 then receives a user input from the user 320 over communication link 382. The interpreter component 340 then receives the user input over communication link 383 and then interprets the received user input to derive a first machine-readable text.

Next, the machine-readable text processor component 350 then receives the first machine-readable text and the user 320's preferences over communication links 384 and 381, respectively, to process the first machine-readable text and the user 320's input preferences to generate a service in the form of a second machine-readable text.

The text-to-audiovisual generator component 360 then receives the second machine-readable text over communication link 385 to generate an audio file and corresponding Computer-Generated Imagery (CGI) from the second machine-readable text. The output processor component 370 receives the audio file and corresponding CGI over communication link 386 to cause an audiovisual output to be displayed in the form of a hologram based on data received from the generated audio file and corresponding CGI.

Communication links 380-386 each use metal, glass, optical, air, space, or some other material as the transport media. Communication links 380-384 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 380-386 can each be a direct link or can include intermediate networks, systems, or devices, and can include a logical network link transported over multiple physical links.

Figure 4:
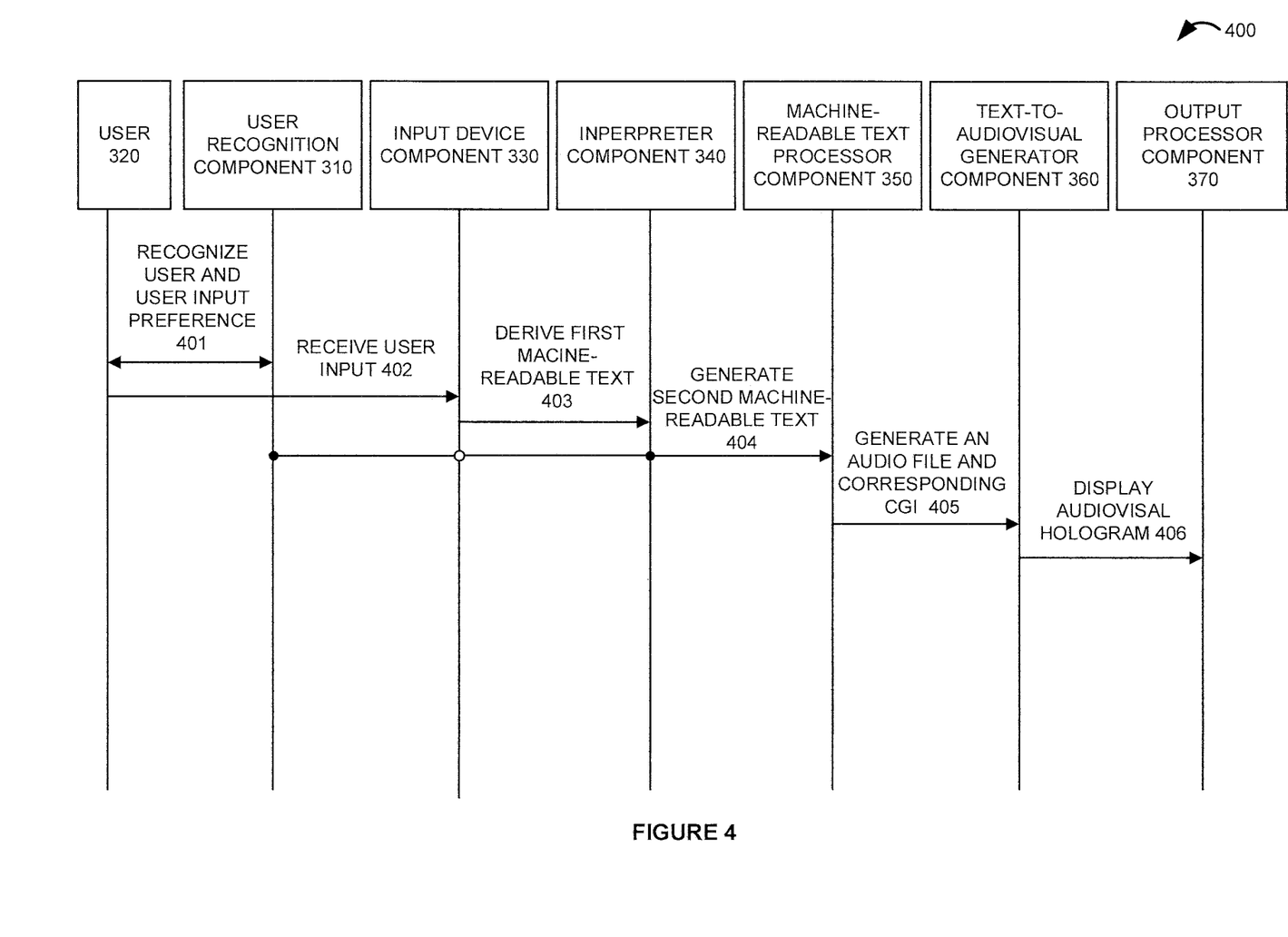
FIG. 4 is a sequence diagram illustrating an example method of operating a conversational holographic assistant.

FIG. 4 is a sequence diagram 400 illustrating a method of operating FIG. 3. It should be understood that the operations of FIG. 4 can also be applied to similar elements of FIG. 1. Elements shown in FIG. 4 operate to provide a real-time service to a user through the use of conversational holographic assistant system 100. FIG. 4 shows a sequence of interactions that occur in six phases. The first phase involves recognizing a user and the user user's input preferences (401), accomplished with reference to user 320 and user recognition component 310 of FIG. 3. The second phase involves receiving a user input at the input device component 330 from the user 320 (402). The third phase involves deriving a first machine-readable text at the interpreter component 340 from the user input received from the input device component 330 (403).

The fourth phase then involves generating a second machine-readable text at the machine-readable text processor component 350 from the first machine-readable text and the user preferences (404), the first machine-readable text and the user preferences received from the interpreter component 340 and the user recognition component 310, respectively. The fifth phase involves generating an audio file and corresponding CGI at the text-to-audiovisual generator component 360 from the second machine-readable text (405), the second machine-readable text received from the machine-readable text processor component 350. The sixth phase involves displaying an audiovisual hologram at the output processor component 370 from the generated audio file and corresponding CGI (406), the generated audio file and corresponding CGI received from the text-to-audiovisual generator component 360.

Figure 5:
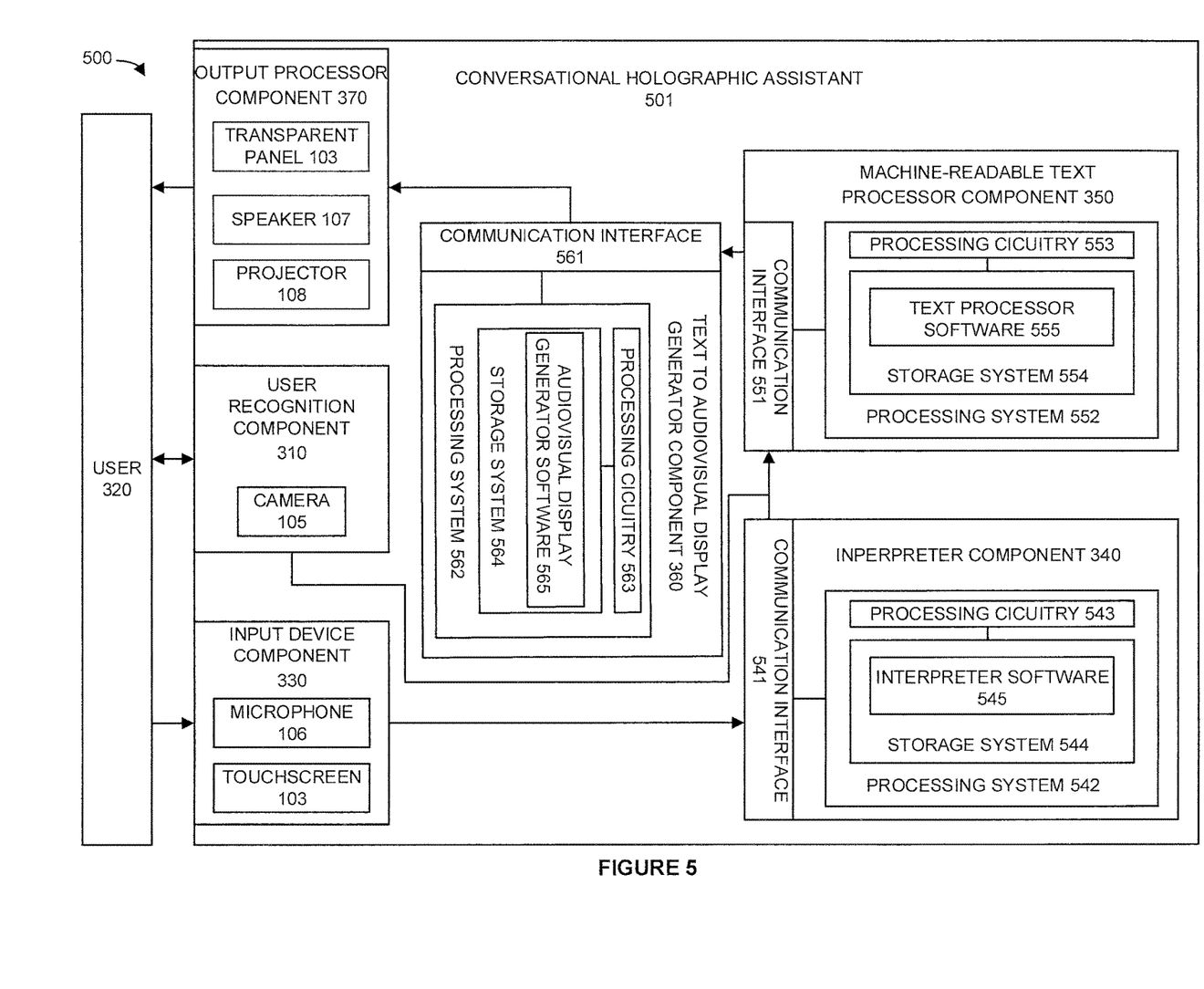
FIG. 5 is a block diagram illustrating the detailed functional components of a conversational holographic assistant.

FIG. 5 is a block diagram illustrating the detailed functional components of a conversational holographic assistant. The user-recognition component 310, input device component 330, interpreter component 340, machine-readable text processor component 350, text-to-audiovisual generator component 360, and output processor component 370 operate with each other in the exact fashion as discussed in FIG. 3. The block diagram of FIG. 5, however, omits communication links 380-386 for clarity, although it should be known that the various components of FIG. 5 are connected through the various communication links 380-386 discussed above.

FIG. 5 is an illustrative block diagram 500 to demonstrate the various electronic and computational devices contained within the components of the conversational holographic assistant 501. In particular, user recognition component 310 contains camera 105. Other electronic detection devices may be suitable substitutions for the camera 105, and it should be known that the present disclosure does not limit the user recognition component to having just a camera to detect a user. Input device component may optimally include a microphone 106 and a touchscreen 103 (the touchscreen may be part of the transparent rigid panel as discussed in FIG. 1), however, other input devices may be suitable, such as a keyboard, a computer mouse, a webcam, a pointing device, among other conventional user input devices for interacting with virtual technologies.

Interpreter component 340 includes a communication interface 541, a processing system 542, processing circuitry 543, storage system 544, and interpreter software 545. In operation, processing system 542 is operatively linked to communication interface 541 and storage system 544. Processing system 542 is capable of executing software 545 stored in computer-readable media, such as that in storage system 544. When executing processing system 542, software 545, directs the interpreter component 340 to operate as described herein. Interpreter component 340 can also include other elements, such as user interfaces, computer systems, databases, distributed storage and processing elements, and other similar computing elements.

Machine-readable text processor component 350 includes a communication interface 551, a processing system 552, processing circuitry 553, storage system 554, and text processor software 555. In operation, processing system 552 is operatively linked to communication interface 551 and storage system 554. Processing system 552 is capable of executing software 555 stored in computer-readable media, such as that in storage system 554. When executing processing system 552, software 555, directs the machine-readable text processor component 350 to operate as described herein. Machine-readable text processor component 350 can also include other elements, such as user interfaces, computer systems, databases, distributed storage and processing elements, and other similar computing elements.

Text-to-audiovisual display generator component 360 includes a communication interface 561, a processing system 562, processing circuitry 563, storage system 564, and audiovisual display generator software 565. In operation, processing system 562 is operatively linked to communication interface 561 and storage system 564. Processing system 562 is capable of executing software 565 stored in computer-readable media, such as that in storage system 564. When executing processing system 562, software 565, directs the text-to-audiovisual display generator component 360 to operate as described herein. Text-to-audiovisual display generator component 360 can also include other elements, such as user interfaces, computer systems, databases, distributed storage and processing elements, and other similar computing elements.

Processing systems 542, 552, and 562 can be implemented within a single processing device, but can also be distributed across multiple processing devices or sub-systems that cooperate in executing program instructions. Examples of processing systems 542, 552, and 562 include general purpose central processing units, microprocessors, application specific processors, and logic devices, as well as any other type of processing device.

Communication interfaces 541, 551, and 561 include one or more network interfaces for communicating over communication networks, such as packet networks, the Internet, and the like. The network interfaces can include one or more local or wide area network communication interfaces, which can communicate over Ethernet or Internet protocol (IP) links Examples of communication interfaces 541, 551, and 561 include network interface card equipment, transceivers, modems, and other communication circuitry.

Storage systems 544, 554, and 564 can comprise any storage media readable by processing systems 542, 552, and 562, respectively, and are capable of storing software 545, 555, and 565. Storage systems 544, 554, and 564 can include volatile and nonvolatile, removable and non-removable media implemented in any method or technology for storage of information, such as computer readable instructions, data structures, program modules, or other data. Storage systems 544, 554, and 564 can be implemented as a single storage device but can also be implemented across multiple storage devices or sub-systems. Storage systems 544, 554, and 564 can comprise additional elements, such as controllers, capable of communicating with processing systems 542, 552, and 562, respectively. In some implementations, the storage media can be a non-transitory storage media. In some implementations, at least a portion of the storage media can be transitory. It should be understood that in no case are the storage media propagated signals.

The output processor component 370 may include a speaker 107, a projector 108 ("optical projection system" as discussed in FIG. 1), and a transparent panel 103 ("transparent rigid panel" as discussed in FIG. 1), however, other output devices may be suitable, such as a computer monitor, a television, or the like.

Figure 6:
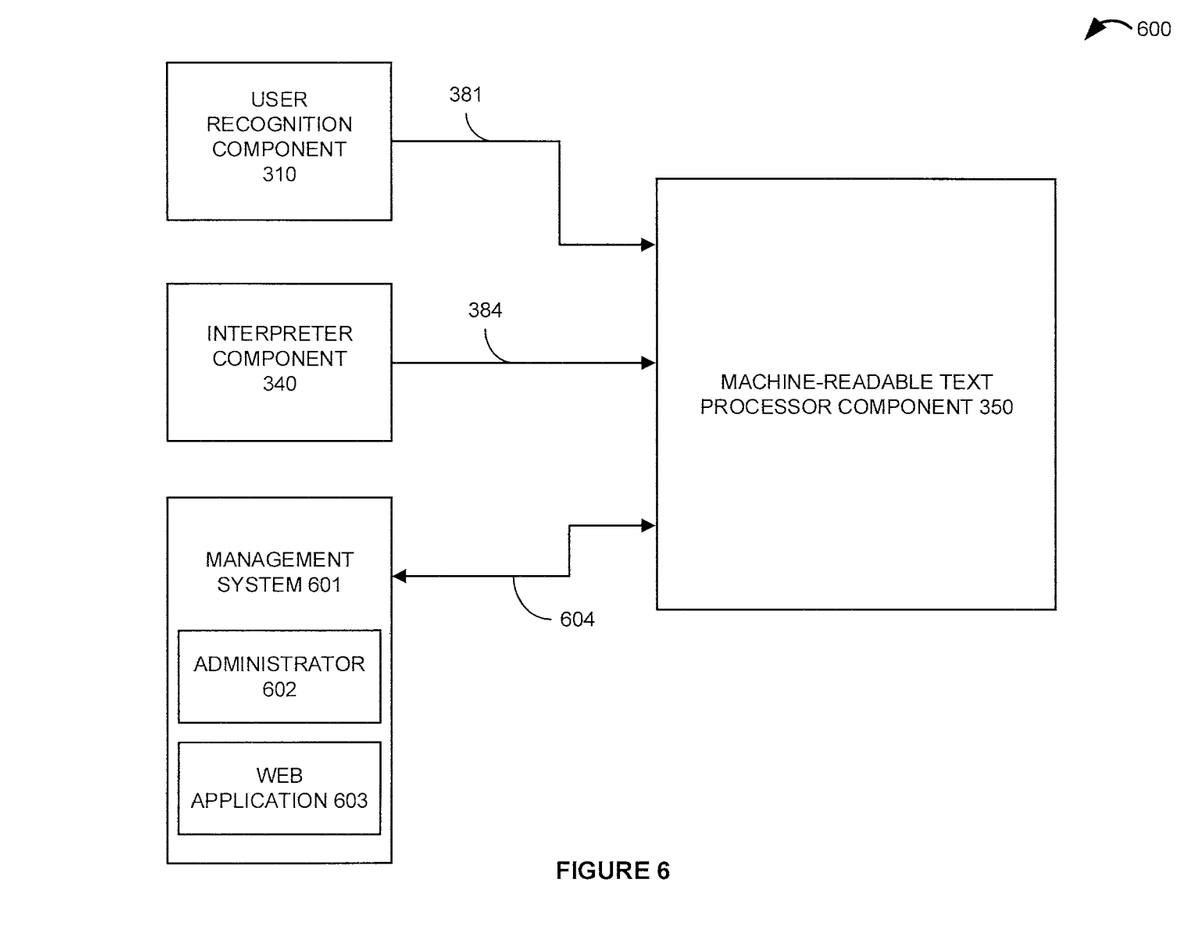
FIG. 6 is a block diagram illustrating the functionality of a machine-readable text processor component of a conversational holographic assistant.

FIG. 6 is a block diagram illustrating an additional functionality of the machine-readable text processor component 350 of the conversational holographic assistant system 100. The machine-readable text processor component 350, the user recognition component 310, and the interpreter component 340 of FIG. 6 all contain the same internal configurations and devices as discussed in FIG. 5. Further, communication link 381 links the user recognition component 310 to the machine-readable text processor component 350, and communication link 384 links interpreter component 340 to the machine-readable text processor component 350 as discussed above.

The block diagram 600 in FIG. 6 further demonstrates that the machine-readable text processor component 350 can be communicatively connected to a management system 601 through communication link 604. Management system 601 includes administrator 602 and web application 603. The management system 601 allows an administrator 602 to make changes to the text processor component 350 through a web application 603. The web application 603 provides the administrators 602 of the management system 601 the ability to review data, usage, metrics, sales performance, and areas where the holographic assistant was unable to answer questions. Administrators 602 are able to update the response the holographic person is capable of providing, and push entirely new sets of data when appropriate. The administrator 602 may also want to update the speech-based training software in the processor component 350 or provide generalized updates to the system. As discussed above, the administrator 602 may also be able to create tests through the web application 603 in order to see how customers respond to multiple numbers of different responses from the holographic assistant, based on similar requests from customers.

Figure 7A:
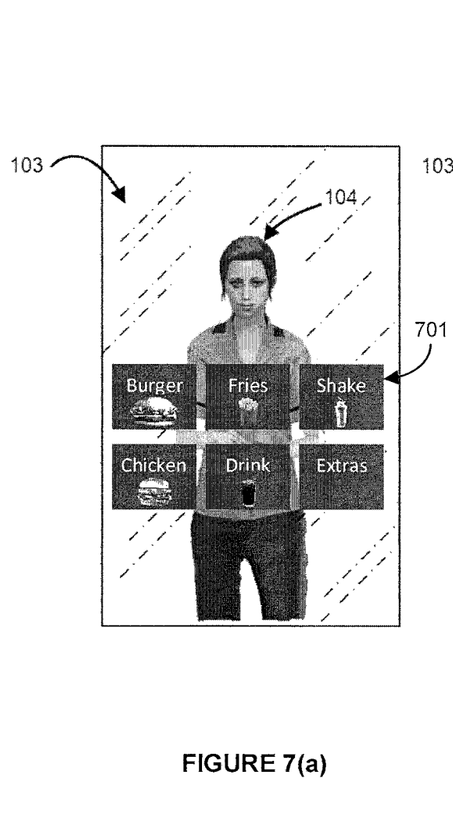
FIGS. 7(a)-(c) are exemplary embodiments of the functionality of the display screen of a conversational holographic assistant.
Figure 7B:
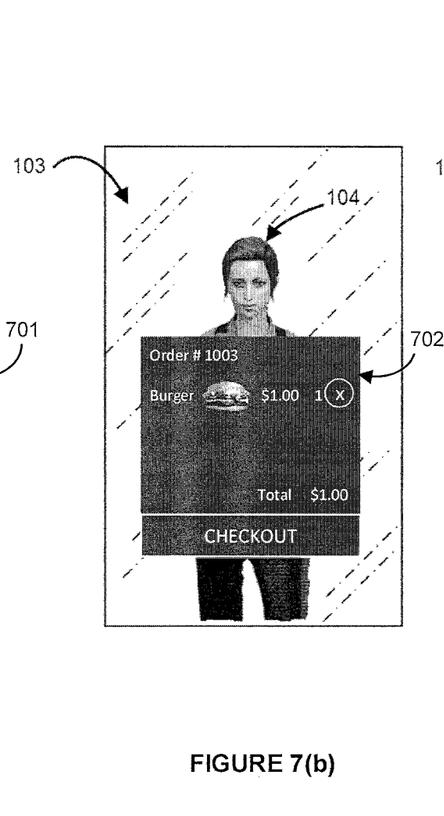
Figure 7C:
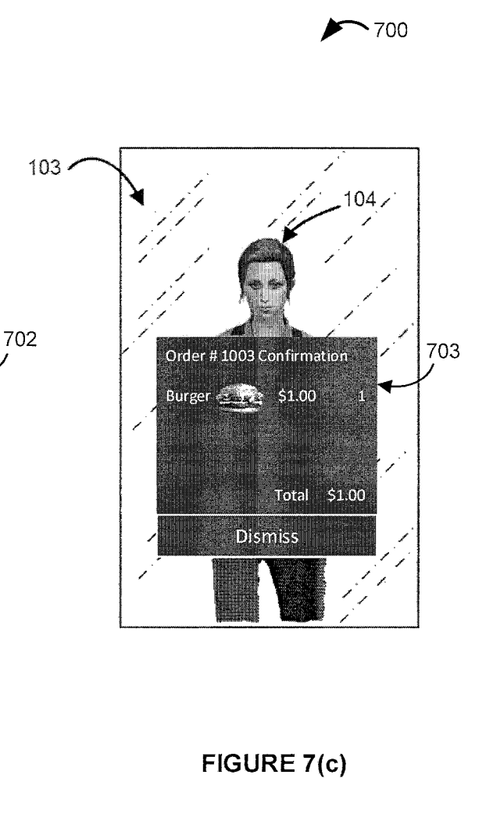

FIGS. 7(*a*)-(*c*) are exemplary embodiments 700 of the functionality of a display screen of a conversational holographic assistant. The term "display screen" is used interchangeably with the term "transparent rigid panel", as discussed with reference to FIG. 1, and "touch screen" as discussed with reference to FIG. 5. FIGS. 7(*a*)-(*c*) present an instance of using a conversational holographic assistant to order food in a restaurant. FIG. 7(*a*) includes a display screen 103, a hologram 104, and menu selections 701. When a user wishes to order a menu item, the user can either verbally command their selection to the assistant, or simply touch the menu selection 701 on the display screen 103.

Turning to FIG. 7(*b*), when the user has made a selection, the display screen 103 then displays a running order summary box 702 to reflect the selected menu selections 701.

When the order is complete, FIG. 7(*c*) shows the display screen 103 with an order confirmation box 703.

There are numerous advantages to the use of a conversational holographic assistant, the overarching advantage being cost-efficiency for companies that employ holographic assistants. It can also be efficient for the user in that the user can get access to information that he is looking for quicker than a human person would be able to provide.

Some of the advantages for companies using conversational holographic assistants include, but are not limited to: augmenting existing staff with holograms; reduction of overhead (taxes, health care, HR, and paid time-off, reduction of legal liabilities and risk, potential reduction of retail footprint with less on-site staff (for example, removing sales counters where customers place orders), providing identical customer service experience at any location, covering labor shortages (e.g. during customer surge, or inclement weather situations), reduction of customer wait times, testing different sales messaged to see what response generates most sales, providing uniform training company-wide (including providing automated updates when new information is available), and, generating real-time data and customer insight (e.g. from detailed description of conversation, identification of patterns that resulted in increased or decreased sales, update response in real time etc.). For example, in a movie theater kiosk, theater operators can test various messages to see what conversation converts to more ticket sales. It is also possible to track sales in real time with onboard credit card processing.

The conversational holographic assistant can speak with customers in any language, or display text in any language, enhancing the user's personalized experience. It can reduce customer wait times, provide additional holographic "employees" to help customers faster. Customers can receive additional visual material based on the request. Examples include maps, points of interest, visual cues for complex topics, and order summaries.

The outfit of the conversational holographic assistant can be changed depending on the customer and location that they are stationed. For example, the outfit of the holographic person should represent the dress code for the retail or business location where it is in use. Staff training can be facilitated by this system, because it is possible to write one program, and update all holographic employees around different geographic location uniformly, and if needed, simultaneously. Speech based training allows for immediate updates to the AI system.

As described before, one of the main applications of the system is in a retail sales environment, office environment, or other location that requires information (ex. shopping mall directions). Some specific non-limiting illustrative use cases are described below.

Figure 8:
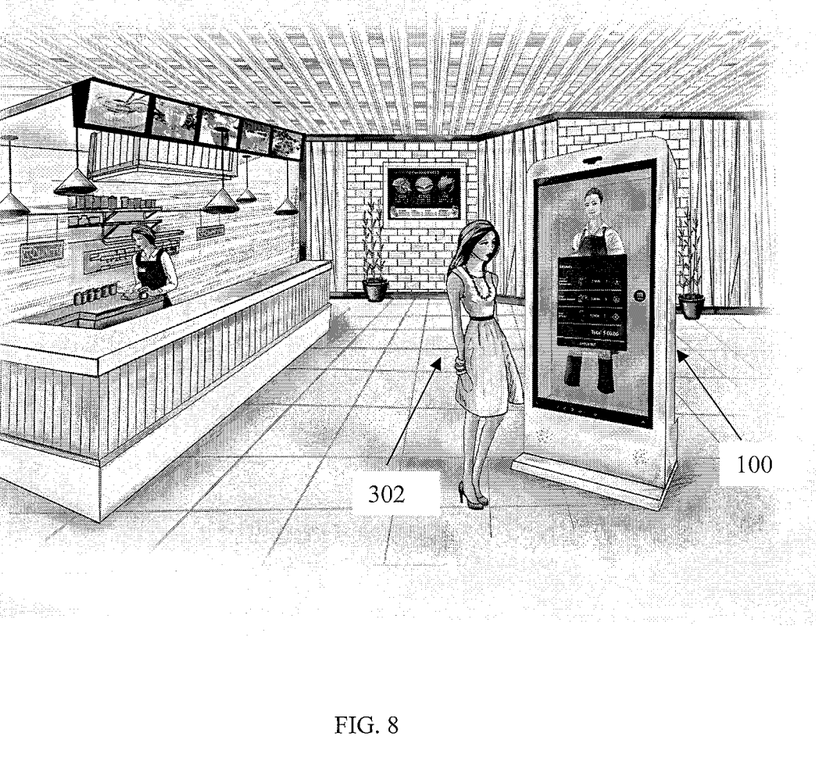
FIG. 8 illustrates the use of the conversational holographic assistant in a retail sales environment.

Use case 1: A fast food restaurant decides to deploy this platform at one of their restaurants. The system greets customers as they arrive, takes their order, and then passes the order to the cooks. Eventually retail areas may be redesigned to remove the customer order counter, and instead provide people with a row of holograms from which to place their orders when walking into the store. FIG. 8 shows a retail environment where a user 320 is seen interacting with a holographic assistant 100.

Use case 2: Movie theaters use the holographic persons in the box office area to provide potential customers with answers to questions like movie ratings, reviews, show times and summaries of various movies. When users enter the area, they can talk to the hologram using natural language to ask these questions. The movie theater can control the marketing message delivered to the customer and even A/B split test the sales message to determine what drives the highest number of ticket sales.

Use case 3: Airlines can use the holographic persons at the airport to speed up the check-in process by ensuring the proper numbers of holograms are available for the expected demand during check-in. The holograms can use facial recognition software to search for any signs of potential violent activities.

Use case 4: Hotels can utilize holographic persons inside their hotels to greet customers as they arrive. The holograms can check in users, and provide them with a Bluetooth encryption code for their hotel rooms. Since the system can detect faces, it can welcome in customers by name, and even pull up their previous history to assign them the same room, or set their room preferences (like temperature).

Use case 5: In personal settings, the holographic assistant may be integrated with existing internet of things to enhance user experience when compared to the user experience with other impersonal digital assistants like Amazons Alexa or Google Home.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the disclosure is not limited to the specific implementations described above, but only by the claims and their equivalents.

What is claimed is:

1. A system comprising:
   a user recognition component, for recognizing users and their input preferences;
   an input device component, for receiving user input;
   an interpreter component, for interpreting the received user input to derive a first machine-readable text;
   a machine-readable text processor component, for processing the first machine-readable text and the user input preferences to generate a service in the form of a second machine-readable text;
   a text-to-audio generator component and a text-to-visual display generator component for generating an audio file and corresponding Computer-Generated Imagery (CGI) from the second machine-readable text, the audio file and CGI corresponding to an audiovisual output in the form of a human-like hologram configured to converse with a user; and
   an output processor component, for displaying the audiovisual output in the form of the human-like hologram that converses with the user in real-time.

2. The system of claim 1, wherein the interpreter component further comprises:
   a natural language interpreter component, for interpreting the received user input to derive the first machine-readable text when the received user input is a verbal command.

3. The system of claim 1, wherein the interpreter component further comprises:
   a touchscreen interface interpreter component, for interpreting the received user input to derive the first machine-readable text when the received user input is a touchscreen command.

4. The system of claim 1, wherein the user recognition component comprises a camera physically coupled to a transparent rigid panel on which the hologram is displayed and communicatively coupled to one or more computing devices.

5. The system of claim 4, wherein the transparent rigid panel is made of glass or plastic.

6. The system of claim 5, wherein at least a portion of the transparent rigid panel has touch screen capabilities to receive user input.

7. The system of claim 1, wherein the input device component comprises a microphone to receive verbal command.

8. The system of claim 1, wherein the output processor component comprises display hardware to display the hologram generated by computer graphic imagery (CGI).

9. The system of claim 8, wherein the display hardware includes a projection system to optically project the hologram generated by computer graphic imagery (CGI).

10. The system of claim 1, wherein the user recognition component comprises facial recognition software that, when executed on the one or more computing devices, identifies a repeat user and the repeat user's preferences.

11. The system of claim 1, wherein the conversational holographic assistant is trained to provide personalized user support.

12. The system of claim 11, wherein the personalized user support includes conversation in the user's preferred language.

13. A method comprising:
   at the one or more computing devices:
   recognizing a user and the user's input preferences;
   receiving an input from the user;
   interpreting the received user input to derive a first machine-readable text;
   processing the first machine-readable text and the user input preferences to generate a service in the form of a second machine-readable text;
   generating an audio file and corresponding Computer-Generated Imagery (CGI) from the second machine-readable text, the audio file and CGI corresponding to an audiovisual output in the form of a human-like hologram configured to converse with the user; and
   causing a rigid transparent panel to display an audiovisual output in the form of a human-like hologram based on data received from the generated audio file and corresponding CGI, the audiovisual output conversing with the user in real-time.

14. The method of claim 13, wherein receiving an input from the user comprises receiving the user's verbal command.

15. The method of claim 13, wherein recognizing the user comprises facial recognition software that, when executed on the one or more computing devices, takes one or more pictures of the user's face and stores the one or more pictures in nonvolatile memory on the one or more computing devices.

16. The method of claim 15, wherein recognizing the user comprises facial recognition software that, when executed on the one or more computing devices, identifies a repeat user and the repeat user's preferences.

17. The method of claim 13, wherein the conversational holographic assistant is displayed on a transparent rigid panel.

18. The method of claim 13, wherein the conversational holographic assistant is trained to provide personalized user support.

19. The method of claim 18, wherein the personalized user support includes conversation in the user's preferred language.

20. A non-transitory computer-readable medium for implementing a conversational holographic assistant on one or more computing devices, the computer-readable medium having instructions stored thereon, the instructions, when executed by one or more processors, cause the processors to perform operations comprising:
- recognizing a user and the user's input preferences;
- receiving an input from the user;
- interpreting the received user input to derive a first machine-readable text;
- processing the first machine-readable text and the user input preferences to generate a service in the form of a second machine-readable text;
- generating an audio file and corresponding Computer-Generated Imagery (CGI) from the second machine-readable text;
- causing an audiovisual output to be displayed in the form of a hologram representing the conversational holographic assistant based on data received from the generated audio file and corresponding CGI.

* * * * *